United States Patent [19]

Kazais et al.

[11] Patent Number: 4,909,340

[45] Date of Patent: Mar. 20, 1990

[54] ELECTRONIC WEIGHING SCALE

[75] Inventors: Emil Kazais; Sid Hejzlar, both of Flushing, N.Y.

[73] Assignee: John Chatillon & Sons Inc., Kew Gardens, N.Y.

[21] Appl. No.: 306,770

[22] Filed: Feb. 3, 1989

[51] Int. Cl.⁴ .......................... G01G 3/14; G01L 1/22
[52] U.S. Cl. .................................. 177/211; 73/862.67
[58] Field of Search ...................... 177/210 R, 211, 1; 73/862.67

[56] References Cited

U.S. PATENT DOCUMENTS 4,531,600  7/1985  Langlais et al. .
4,696,359  9/1987  Glibbery .............................. 177/211
4,763,739  8/1988  Kasinoff ........................... 177/210 R Primary Examiner—George H. Miller, Jr.
Attorney, Agent, or Firm—John F. A. Earley; John F. A. Earley, III; Michael Walker

[57] ABSTRACT

A cordless electronic weighing scale which includes a load receiving element, such as a weighing pan, an electronic circuit including a battery, a load cell operatively attached to the load receiving element for weighing items and generating analog signals representative of items being weighed, an analog-to-digital converter connected with the load cell for receiving analog signals therefrom and converting them into digital signals, a first logic circuit connected between the load cell and the converter to cause analog signals to be transmitted to the converter in an on and off fashion, and a digital display circuit connected to the analog-to-digital converter to provide a digital display of analog signals from the analog-to-digital converter to indicate the weight of the items on the load receiving element. In the system a pulse plus a non-pulse constitutes a cycle and the pulse is about 1% of the cycle and the non-pulse is about 99% of the cycle. An ambient light switching circuit means is provided which is responsive to the presence of sufficient ambient light to be on and alternatively responsive to the lack of sufficient light to be off. The ambient light switching circuits are connected to the battery so energy is provided when the ambient light switching circuit is on but does not provide energy to the load cell and the amplifier, the main power-consuming components when the ambient light switching circuit are off.

17 Claims, 1 Drawing Sheet

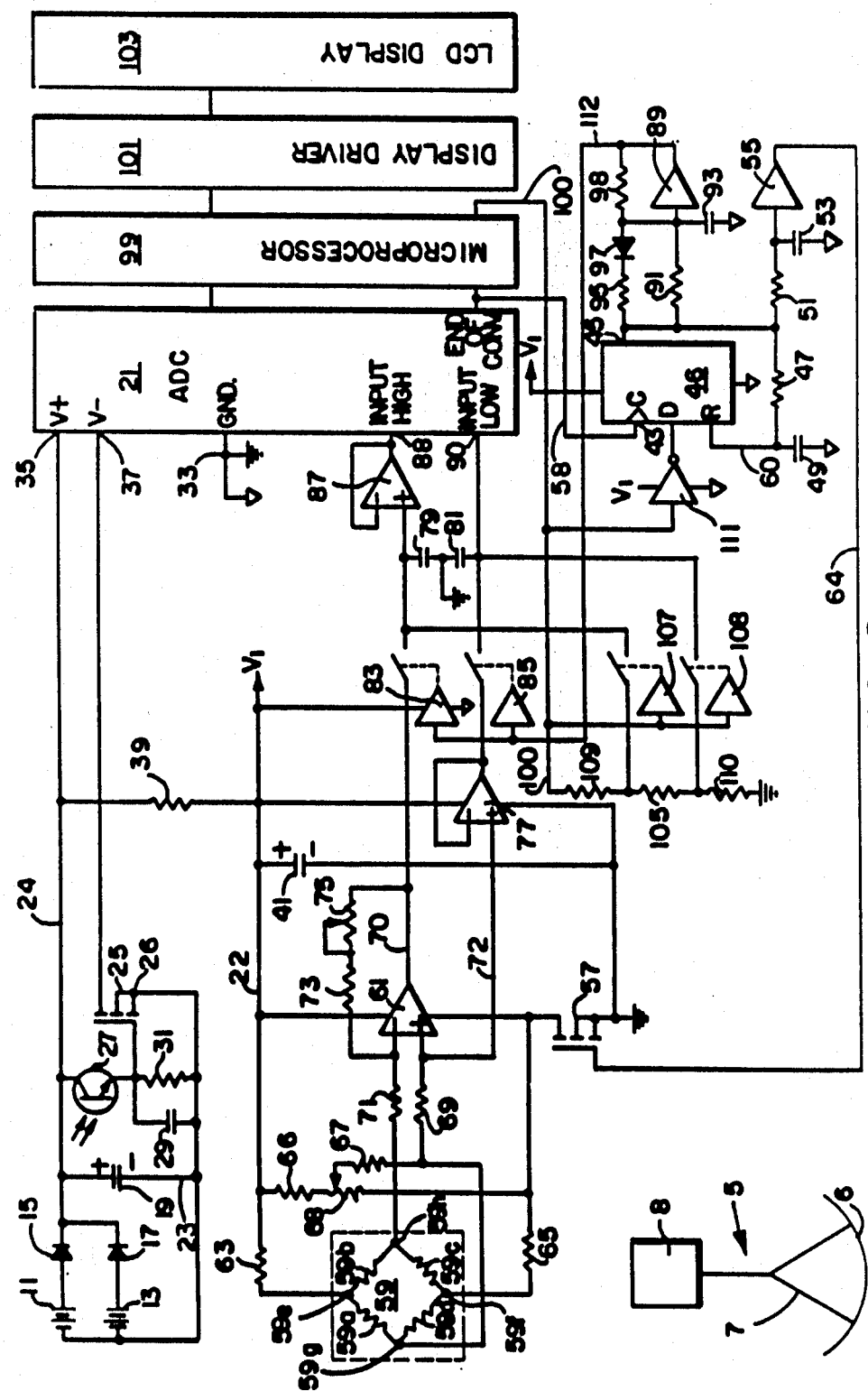

ELECTRONIC WEIGHING SCALE

BACKGROUND OF THE INVENTION

In recent times, weighing scales, especially of the type used in the produce section of supermarkets to weigh vegetables, have been of the digital type with lighted digital displays showing numbers to a customer. Such scales, whether used as produce scales, or dairy counter scales, or delicatessen counter scales, are safer and better if there are no wires or cords running from the scale to electrical outlets which supply the electrical energy. Wires or cords are dangerous to customers who walk near them in the store, not only from the standpoint of danger from electrical shock, but also from the danger of a mechanical obstruction which might trip them.

Accordingly, it has been desired to eliminate the electrical cords which extend from electronic weighing scales, and to provide cordless weighing scales.

Cordless weighing scales may be actuated by batteries, such as dry cell batteries, or rechargeable batteries, or solar batteries which are directly energized by ambient light. However, batteries have presented a number of problems. The dry cell batteries do not last very long before they need to be replaced. The rechargeable batteries need to be recharged often. The ambient light energized batteries, or solar batteries, require expensive circuitry because it is necessary to provide high impedances and other circuit parameters to keep the consumption of energy low while at the same time limiting the susceptibility of such circuitry to jitter during periods of decreasing light (for instance, with the onset of evening hours).

SUMMARY OF THE INVENTION

This invention relates to electronic weighing scales which may be operated by ordinary off-the-shelf batteries.

It is an object of the invention to provide scales which operate for long periods of time without the need to replace the batteries.

Because of its novel design, the inventive scale may operate for a long period of time before replacement batteries must be installed. For example, two 9-volt lithium transistor batteries may last a year even though the scale is left on continuously.

To assist in this longevity, the scale includes an automatic shut-off circuit which disconnects the flow of current from the batteries to some of the major power-consuming elements of the scale whenever the surrounding light level reaches such a low magnitude that a digital display cannot be read, and returns the power automatically when the light level is of a sufficient intensity to enable the reading of the digital display. This turning off of the power when the digital display cannot be read prolongs the life of the batteries.

A major power-consuming element is a strain gauge loadcell, which senses the weight of an object and produces a proportional electrical output. Industry-standard loadcells, having electrical input impedances between 350 and 1000 ohms, are available from many sources. Loadcells with higher impedances on the order of several thousand ohms would be preferable, but they are much more difficult to manufacture, are not readily available and consequently are more expensive.

In the disclosure of an example of the invention hereinafter presented, lithium batteries were chosen for their characteristic of having a long shelf-life without self-discharge. Other types of batteries may be used after their self-discharge is taken into account.

It is an object of this invention to provide an electronic weighing scale which is cordless and which provides for low power consumption and long battery life and utilizes an industry-standard strain gauge loadcell.

This object is obtained, in part, by using a microprocessor in the electronic circuitry of the weighing scale, which significantly reduces the number of electronic components formerly used in conventional designs, and thereby reducing the power needed to operate the inventive scale.

Further to conserve the batteries, the scale circuitry includes a pulse circuit which supplies energy in a pulse fashion rather than continuously, whereby the power is pulsed to a primary load-receiving circuit which includes an industry standard strain gauge loadcell having electrical impedance of between 350 and 1000 ohms, and a pair of amplifiers. The power is pulsed at a rate of approximately 0.4 milliseconds ON and 41.5 milliseconds OFF. Because of the relatively long OFF time (99% OFF, 1% ON), current flowing into the strain gauge loadcell is not intense enough to produce the very undesirable self-heating found in conventional scale designs which tends to alter the spring rate of the loadcell.

The amplified output from the strain gauge loadcell is held on two capacitors during OFF time, and is fed into an analog-to-digital converter.

At the end of the conversion from the analog to the digital signal, the digital output is presented to a microprocessor for further digital computation, and a pulse which signals the end of conversion is used to initiate a new cycle of 0.4 milliseconds ON and 41.5 milliseconds OFF to the primary load receiving circuit.

BRIEF DESCRIPTION OF THE DRAWINGS

FIG. 1 is a diagrammatic view of an electronic weighing scale constructed in accordance with this invention;

FIG. 2 is a schematic drawing of an electronic circuit of the invention.

DETAILED DESCRIPTION

Turning to the drawings, in FIG. 1 there is shown an electronic weighing scale 5 which includes a load receiving element such as scale pan 6, suspending apparatus 7 which support the scale pan 6, and an electronic circuit 8 which is connected to the suspending apparatus 7. While FIG. 1 shows the major elements of a hanging scale, this invention is not restricted to this particular type of scale. Other weighing devices, such as counter and bench scales and floor scales may benefit from this invention. Also, the load receiving element is not limited to a scale pan, but may be a platform, scoop, hook or the like for receiving items to be weighed.

Ambient Light Level

Power for the scale 5 is provided by two 9-volt transistor batteries 11 and 13 shown in FIG. 2. The batteries 11, 13 are connected in parallel through diodes 15 and 17, and the nine volts are filtered by capacitor 19. Positive lead 24 of capacitor 19 is connected directly to an analog-to-digital converter (ADC) 21, and negative lead 23 of capacitor 19 is connected to the converter 21 through a MOS transistor 25.

When the ambient light level is sufficient so that the scale 5 can be read, a phototransistor 27 turns the MOS transistor 25 on. Capacitor 29 and resistor 31 combine as a filter. The converter 21 provides an output ground 33, which is five volts lower than input voltage V+ at point 35 of the converter 21 which is nine volts. Consequently, V1, being filtered by a resistor 39 and a capacitor 41, is +5 volts relative to the output ground 33, and is the supply voltage for the rest of the circuit.

The leading edge of the end-of-conversion pulse, which is produced internally by the converter 21, is transmitted to point 43 and turns on Flip-Flop 46. The Flip-Flop 46 output at terminal 45 resets the Flip-Flop 46 after a delay of 0.4 milliseconds, as determined by resistor 47 and capacitor 49. Output at terminal 45 is also delayed ten microseconds by resistor 51 and capacitor 53 and is amplified by amplifier 55, which switches on MOS transistor 57, which in turn supplies power to strain gauge bridge 59 and amplifier 61.

Resistors 63 and 65 are added to the circuit to further decrease the power consumption of the bridge 59.

Resistors 66 and 67, and trimpot 68 are used to balance the bridge 59 when a load-receiving element, such as a weighing pan or scoop 6, is suspended from the strain gauge loadcell.

The signal from strain gauge bridge 59 is amplified by amplifier 61, with resistors 71, 73 and trimpot 75 determining the gain of the amplifier 61. Resistors 69 and 71 are the bias for amplifiers 61.

The amplified signal is of the differential type, between outputs of amplifier 61 and follower 77, and is applied to a sample and hold circuit comprises of capacitors 79 and 81, gates 83 and 85, and a follower 87. Whenever gates 83 and 85 are conducting, the differential signal between amplifier 61 and follower 77 is stored on capacitors 79 and 81.

Gates 83 and 85 are switched on by gate 89, which receives its signal from the Flip-Flop 46.

The leading edge of the output pulse from gate 89 trails the Flip-Flop output at terminal 45 by 0.1 millisecond, a function of the resistor 91 and the capacitor 93. The trailing edge of the output signal from gate 89 is delayed from the falling edge of the Flip-Flop 46 output pulse by only five microseconds, this delay being determined by the resistor 95, capacitor 93, and diode 97. A resistor 98 provides additional control for amplifier 89.

The amplified signal from the strain gauge bridge 59, which is stored on capacitors 79 and 81, is now presented to the analog-to-digital converter 21. The follower 87 serves as a means for preventing discharge. The converter 21 produces a digital output directly proportional to the analog input signal between the outputs of follower 87 (input high at point 88) and (input low at point 90) of capacitor 81, and is coupled to a programmable microprocessor 99.

The microprocessor 99 executes the program steps contained in its internal ROM (Read Only Memory) and transmits the result to the display drive 101, which in turn initiates LCD display 103.

Overheating

In order to satisfy the requirements of the N.B.S. Handbook 44 for "legal-for-trade" weighing scales, which establishes operating temperature ranges within which such devices must remain accurate, a thermistor 105 senses the surrounding temperature by changing its resistance proportionately. Once every few minutes the microprocessor 99 interrupts the weighing program for a very short period of time and initiates the closing of gates 107 and 108, instead of gates 83 and 85. When the foregoing occurs, power is directed through resistors 109 and 110 to thermistor 105. Simultaneously therewith, the Flip-Flop 46 is blocked off by gate 111, which prevents the closing of gates 83 and 85. The signal from the thermistor 105 is transmitted through the closed gates 107 and 108, is stored on capacitors 79 and 81, and passes into the converter 21 and the microprocessor 99. The microprocessor 99 compares the digital value of this signal with the limiting values stored in its memory. If the input signal is outside of the permissible range, the microprocessor 99 sends an error message to a display driver 101, which initiates an "error" display on LCD-display 103.

Expanded Description

To further explain the invention, FIG. 2 shows two batteries 11 and 13 whose respective positive sides are connected to the diodes 15 and 17. The negative sides of the batteries are connected to MOS transistor 25 and accordingly, if the MOS transistor 25 is not closed, there is no voltage V+ or V− applied to the analog digital converter 21.

The MOS transistor 25 becomes energized or closed when there is a potential across resistor 31. This potential occurs when the transistor 27 is "turned on." The transistor 27 is a photosensitive transistor and is "turned on" when there is sufficient ambient light to turn it on. When the ambient light surrounding the transistor 27 in the place of business is sufficiently bright to "turn on" the transistor 27, a voltage develops across capacitor 29 and resistor 31 and the MOS transistor 25 is turned on and conducts.

The diodes 15 and 17 serve to insure that in the event that one battery, either battery 11 or battery 13, becomes lower in voltage than the other battery, the current does not pass from one battery back into the other.

Capacitor 19 functions as a general filter. When transistor 25 is energized, there is a steady voltage supplied from the batteries 11, 13 to the converter 21.

The capacitor 29 and resistor 31 provide an RC time constant to the output of the transistor 27 and accordingly a time delay which affects its "turning off" period. The time delay is employed so that if the light, which is "turning on" the transistor 27, is not solidly present, or if someone should walk close to the device and block the light, the scale does not terminate its "turned on" condition for as long as the RC time constant provides. The scale circuit described thus far has produced the voltage V+ and V− and applied those voltages to the analog-to-digital converter 21. The analog-to-digital converter 21 is a MAX 134 CPL manufactured by Maxim Integrated Products, Inc.

Internally the analog-to-digital converter 21 provides an output which is equal to zero volts, or ground potential, on line 33. The voltage V+ is five volts above ground while the voltage V− is minus four volts with respect to ground.

As can be seen in FIG. 2, a resistor 39 is connected between line 22 and line 24. In a preferred embodiment, the resistor 39 is 20 ohms and therefore the output voltage V1 is virtually the same as the input voltage V+. The voltage V1 is a source of voltage which is provided to a number of components in the circuit as will become apparent from the following discussion. In general, the circuitry can be considered to include: (1) first logic circuitry connecting the bridge circuit to the analog-todigital converter and including such components as amplifier 61 as well as followers 77 and 87; (2) second logic circuitry which switches on the first logic circuitry and the power and includes such components as Flip-Flop 46, gates 89 and 55, and MOS transistor 57; and (3) third logic circuitry which introduces the temperature monitor and includes such components as the gates 107 and 108 as well as thermistor 105.

Bridge circuit 59 is made up of four strain gauges 59a to 59d. The voltage input to bridge terminals 59e and 59f are not initially effective for operation of the bridge because MOS transistor 57 is not initially conducting. When the voltages V+ and V− are applied to the analog-to-digital converter 21, a clock pulse circuit is turned on whose output is labeled "end of conversion" and which provides clock pulses on line 58. The line 58 is connected to a D type Flip-Flop 46 at terminal 43. The inputs to the D type Flip-Flop 46 are clock input C, data input D and reset input R. Only one output is shown in FIG. 2. Note that the input from the microprocessor 99 to D is transmitted through an inverting gate 111. During one portion of the operation the microprocessor 99 provides a negative signal on line 100 to inverting gate 111, and the negative signal is inverted to a positive signal and applied to the data port D. Accordingly when the "end of conversion" clock signal is applied on line 58, the Flip-Flop 46 is "turned on" and there is positive output signal from the Flip-Flop 46. The positive output signal is transmitted to the gate 55 but is delayed by the RC circuit 51 and 53. The purpose of the last mentioned delay is to assure that gates 83 and 85 open before MOS transistor 57 opens and disconnects power to the bridge 59.

The output from the gate 55 is transmitted on line 64 to the MOS transistor 57 to provide a difference of potential across MOS transistor 57 and thus cause the MOS transistor 57 to conduct. It should be noted that the Flip-Flop 46 is configured as a monostable multivibrator being "turned on" for 0.4 milliseconds and turned off for 41.5 milliseconds.

Once the MOS transistor 57 conducts, a voltage is applied across the bridge circuit 59, and the unbalance of the bridge is sensed at the terminals 59g and 59h and is applied to the operational amplifier 61. It will be recalled that all of the resistors in the bridge circuit 59 are a strain gauges 59a, b, c, and d whose resistances change in response to being stretched or compressed. So when an item is put on the scale, it stretches or compresses the strain gauge members 59a through 59d of the bridge 59 and there is a voltage unbalance between the points 59g and 59h. The unbalanced voltage provides a difference in the voltage supplied to the operational amplifier 61 so there is a high input or high voltage signal on line 70 and a low voltage signal on line 72. The low voltage signal on line 72 is transmitted to a follower 77 which provides a high impedance to the signal being transmitted to the low input port 90 of the analog-to-digital converter 21.

Note that the output from the follower 77 cannot be transmitted to the low input port 90 just as the high output signal from the operational amplifier 61 cannot be transmitted to the high input port 88 because the respective gates 85 and 83 have not been closed. The gates 85, 83, 107 and 108 are shown as being mechanically closeable for illustration purposes. Actually, these gates are closed and opened electronically.

It will be recalled that the Flip-Flop 46 was "turned on" in response to the clock signal coming from the analog-to-digital converter 21 on line 58. The output from the Flip-Flop 46 is also transmitted to gate 89 and the output from the gate 89, along line 112, causes gates 85 and 83 to close and thus provide a circuit to the high input port 88 and to the low input port 90 of analog-to-digital converter 21. The resistor 91 along with the capacitor 93 provide a time delay to the gate 89 and after that time delay the signal closes gates 85 and 83. The reason for the time delay is to assure that power to the bridge 59 is restored before gates 83 and 85 close. The resistor 95 as well as the diode 97 act as a discharge circuit for the capacitor 93.

When the gates 85 and 83 are closed, the output from the bridge 59 is transmitted to hold capacitors 79 and 81, which provide input signals to both the high input port 88 and the low input port 90 of the converter 21. The analog signal, which is the difference between the high input and the low input, represents the weight of the item on the scale. That analog signal is converted into a digital signal and transmitted to the microprocessor 99 where that digital signal is transmitted to the display driver 101 and thereafter to LCD display device 103.

Since in most states the law requires that the scale be used only within a certain range of ambient temperatures, the present circuit provides a means for continually monitoring whether or not the system is within that legal range. The microprocessor 99 is programmed to periodically check the scale from a thermal standpoint. When such a monitoring operation is to take effect, a positive signal is provided on line 100 which is transmitted to the gate 111 where it is inverted to a negative signal which blocks the turning on of the Flip-Flop 46. The same positive signal is transmitted across the resistor 109, the resistor 105 and resistor 110. Actually, the resistor 105 is a thermistor and it responds to the ambient temperature of the circuit. The positive signal on line 100 is also transmitted to close the gates 107 and 108. When the gates 107 and 108 are closed in response to the positive signal on line 100, the difference in value of the voltage across the thermistor 105 is transmitted to the high input port 88 and the low input port 99 to provide an analog signal to the analog-to-digital converter 21. That analog signal is converted into a digital signal and transmitted to the microprocessor 99. In microprocessor 99 that digital value is compared against a stored value and if the difference is within a certain acceptable range, the scale is permitted to continue in operation. If the analog signal is outside either limit of the acceptable range, then the microprocessor 99 provides a signal to the display device 101 indicating that the weighing device is operating at an ambient temperature which may cause incorrect readings. As mentioned earlier, the capacitors 79 and 81 are sample-and-hold devices for the circuits supplying signals to the high input port 88 and to the low input port 90.

Operation

The present invention includes an electrical circuit for use in weighing scales which are used to weigh such items as vegetables, dairy products, meat products, delicatessen products and the like. The weight of an item is displayed in digital form. The present circuit arrangement employs a strain gauge bridge to act as a load cell.

In a preferred embodiment, electrical energy is supplied to the system by two nine volt lithium transistor batteries 11 and 13. The batteries 11 and 13 are activated by an MOS transistor 25 which is "turned on" in response to an associated photosensitive transistor 27 being "turned on" by sufficient ambient light. In other words, when the store becomes light enough, either naturally or through overhead lighting devices, for the customer to read the digital display, the scale assumes that business hours are in effect and the circuit supplies electrical energy. The electrical energy is transmitted to an analog-to-digital converter 21 which includes a clock pulse generator.

The clock pulse generator repeatedly provides first and second clock pulses to second logic circuitry. The second logic circuitry employs a Flip-Flop 46 which is configured as a monostable multivibrator. The Flip-Flop 46 is "on" in response to a first clock pulse for 0.4 milliseconds, and "off" for 41.5 milliseconds. During the "on" period, a second MOS transistor 57 is closed or energized and electrical energy is supplied to the load cell. The output signals from the load cell are amplified and transmitted to a pair of gates 83 and 85. The gates 83 and 85 are closed in response to the "on" signal from the monostable multivibrator 46 so that the amplified load cell signals are transmitted to a pair of hold capacitors 79 and 81 which "hold" the signals. After the hold capacitors 79 and 81 have received the signals from the load cell, the circuit transfers into the "off" status, but the analog-to-digital converter 21 can still receive the load cell signals from the "hold" capacitors 79 and 81. The difference between the signals on the two "hold" capacitors 79 and 81 is an analog signal representing the weight of the item that is being weighed. That analog signal is then translated into a digital signal and transmitted to a microprocessor circuit 99. The microprocessor circuit 99 transmits the digital signals to digital display devices 101, 103.

The microprocessor circuit 99 periodically interrupts the action of the Flip-Flop 46 previously described. During this interruption, the microprocessor 99 interrogates a bit of logic circuitry in the circuit which includes a thermistor 105. The thermistor circuit 105 provides signals, which are indicative of the ambient temperature to the hold capacitors 79 and 81 and therefrom to the analog-to-digital converter 21. The analog signal developed across the thermistor 105 represents the ambient temperature of the circuit and that information in digital form is transmitted to the microprocessor 99. In the microprocessor circuit 99, the temperature value is compared with a previously stored value and if the actual value of the ambient temperature is within a predetermined acceptable temperature range, then the system carries on without interruption. However, if the ambient temperature is outside the stored predetermined acceptable temperature range, then the microprocessor 99 transmits a signal to the display devices 101, 103 to display an error message.

Advantages

The scale circuit just described uses a minimum of electrical energy because the circuit is operative only when there is sufficient ambient light for the user to read the scale, which means that there is sufficient natural light, or that the store lights are turned on. In addition, with respect to using a minimum of electrical energy, it should be understood that the scale circuit is "turned on" for only one percent of the cycle and hence the scale consumes only a small amount of energy during each cycle. The limited "turn on" period reduces the heat generated by the scale and that feature enhances the stability of the apparatus as viewed from a temperature standpoint.

The present scale employs a circuitry technique which turns off the scale when the ambient light is insufficient to enable the user to read the digital display. The turning off of the scale during such periods, of course, saves electrical energy and therefore lengthens the time between replacements of batteries. Also, the present scale when operating provides clock pulses so that the scale is "turned on" for a very short period of time, (approximately one percent of a cycle).

Also, the present circuit turns the scale off approximately 99% of the cycle and, of course, the turning off of the scale for such a relatively long time reduces the energy used and prolongs the useful life of the batteries.

In addition, the turning off of the scale for such a relatively long period of time reduces the likelihood of the scale heating up and therefore reduces the likelihood of the scale committing errors due to excessive self-heating.

Further, the present scale includes circuitry to monitor ambient temperatures and if the ambient temperature exceeds an established temperature range, the apparatus displays an error-message.

In a preferred embodiment of the invention, the circuit elements of FIG. 2 are as follows:

| Element | Description |
|---|---|
| batteries 11, 13 | 9 volts (Eastman Kodak Lithium Battery No. U9VL) |
| diodes 15, 17 | 1N914 |
| capacitor 19 | 220 uF |
| converter 21 | MAX134CPL |
| transistor 25 | 2N7000 |
| phototransistor 27 | MRD3054 |
| capacitor 29 | 0.1 uF |
| resistor 31 | 10M ohms |
| resistor 39 | 20 ohms |
| capacitor 41 | 1000 uF |
| Flip-Flop 46 | CD4013BE |
| resistor 47 | 2.7M ohm |
| capacitor 49 | 150 pF |
| resistor 51 | 100K ohms |
| capacitor 53 | 150 pF |
| amplifier 55 | CD4077BE |
| transistor 57 | VN0300L |
| strain gauge loadcell 59 | 750 ohms |
| amplifier 61 | OP77EP |
| resistor 63 | 147 ohms |
| resistor 65 | 147 ohms |
| resistor 66 | 121K ohm |
| resistor 67 | 383K ohms |
| trimpot 68 | 100K ohms |
| resistor 69 | 2.21K ohms |
| resistor 71 | 2.21K ohms |
| resistor 73 | 100K ohms |
| trimpot 75 | 10K ohms |
| follower 77 | TLC27L2CP |
| capacitor 79 | 0.047 uF |
| capacitor 81 | 0.047 uF |
| gate 83, 85 | MC14016BCP |
| follower 87 | TLC27L2CP |
| gate 89 | CD4077BE |
| resistor 91 | 1M ohms |
| capacitor 93 | 150 pF |
| resistor 95 | 47K ohms |
| diode 97 | 1N914 |
| resistor 98 | 10M ohms |
| microprocessor 99 | MC1468705F2S |
| display driver 101 | ICM7211AMIPL |
| LCD display 103 | 4½ digits LCD |
| thermistor 105 | IC1001-2 |
| gates 107, 108 | MC14016BCP |
| resistor 109 | 18.7K ohms |
| resistor 110 | 18.7K ohms |

-continued

| Element | Description |
| --- | --- |
| inverting gate 111 | CD4077BE |

We claim:

1. A cordless electronic weighing scale 5, comprising
a load receiving element 6, such as a weighing pan, platform, scoop, hook and the like for receiving items to be weighed,
an electronic circuit 8 connected to the load receiving element 6 including
battery means 11, 13,
load cell means 59 having an industry standard load cell means having a low impedance of several hundred ohms operatively attached to the load receiving element 6 for weighing items and generating analog signals representative of their weights,
analog-to-digital converter 21 means connected in circuit with the load cell means 59 for receiving the analog signals therefrom and converting them into digital signals,
pulsing and amplifying circuit means 57, 61, 77, 79, 81, 83, 85, 87 connected in circuit between the load cell means 59 and the analog-to-digital converter means 21 to provide power to the load cell means 59 and to transmit the analog signals in pulse form to the analog-to-digital converter means 21 in an on and off fashion to conserve the energy of the battery means 11, 13,
and digital display means 101, 103 connected in circuit with the analog-to-digital converter means 21 through a microprocessor means 99 to provide a display of signals from the analog-to-digital converter means 21 to indicate the weight of the items on the load receiving element 6.

2. The cordless weighing scale 5 of claim 1, wherein the pulsing circuit means includes a monostable multivibrator 46 which is turned on to initiate power to the loadcell means 59 and to effect said transmission of said analog signal in pulse form, and turned off for the non-pulse periods between pulses.

3. The cordless weighing scale 5 of claim 2, wherein a pulse and a non-pulse constitute a cycle and the pulse is about 1% of the cycle and the non-pulse is about 99% of the cycle.

4. The cordless weighing scale 5 of claim 1, wherein the load cell means 59 has an impedance of approximately 750 ohms.

5. A cordless electronic weighing scale 5, comprising
a load receiving element 6, such as a weighing pan, platform, scoop, hook and the like for receiving items to be weighed,
an electronic circuit 8 connected to the load receiving element 6 including
battery means 11, 13,
load cell means 59 having a low impedance operatively attached to the load receiving element 6 for weighing items and generating analog signals representative of their weights,
analog-to-digital converter 21 means connected in circuit with the load cell means 59 for receiving the analog signals therefrom and converting them into digital signals,
pulsing and amplifying circuit means 57, 61, 77, 79, 81, 83, 85, 87 connected in circuit between the load cell means 59 and the analog-to-digital converter means 21 to provide power to the load cell means 59 and to transmit the analog signals in pulse form to the analog-to-digital converter means 21 in an on and off fashion to conserve the energy of the battery means 11, 13,
digital display means 101, 103 connected in circuit with the analog-to-digital converter means 21 through a microprocessor means 99 to provide a display of signals from the analog-to-digital converter means 21 to indicate the weight of the items on the load receiving element 6,
ambient light switching circuit means 25, 27 responsive to the presence of sufficient ambient light to be on and alternatively responsive to the lack of sufficient light to be off,
said ambient light switching circuit means 25, 27 being connected to the battery means 11, 13 so that the battery means 11, 13 provide energy when the ambient light switching circuit means 27 is on and do not provide energy to the main power-consuming components of the circuit when the ambient light switching circuit means 27 is off.

6. A cordless electronic weighing scale 5, comprising
a load receiving element 6, such as a weighing pan, platform, scoop, hook and the like for receiving items to be weighed,
an electronic circuit 8 connected to the load receiving element 6 including
battery means 11, 13,
load cell means 59 having a low impedance operatively attached to the load receiving element 6 for weighing items and generating analog signals representative of their weights,
analog-to-digital converter 21 means connected in circuit with the load cell means 59 for receiving the analog signals therefrom and converting them into digital signals,
pulsing and amplifying circuit means 57, 61, 77, 79, 81, 83, 85, 87 connected in circuit between the load cell means 59 and the analog-to-digital converter means 21 to provide power to the load cell means 59 and to transmit the analog signals in pulse form to the analog-to-digital converter means 21 in an on and off fashion to conserve the energy of the battery means 11, 13,
digital display means 101, 103 connected in circuit with the analog-to-digital converter means 21 through a microprocessor means 99 to provide a display of signals from the analog-to-digital converter means 21 to indicate the weight of the items on the load receiving element 6,
scale temperature circuit means 105 which are responsive to the ambient temperature of the circuitry of the cordless weighing scale 5 connected in circuit with the analog-to-digital converter means 21 for generating a warning signal when the ambient temperature of the cordless weighing scale 5 is outside a selected range,
and means for indicating that the digital display means 101, 103 may be in error because the temperature of the cordless weighing scale 5 is outside the selected temperature range.

7. A cordless electronic weighing scale 5, comprising
a load receiving element 6, such as a weighing pan, platform, scoop, hook and the like for receiving items to be weighed,
an electronic circuit 8 connected to the load receiving element 6, including batteries 11, 13, load cell means 59 operatively attached to the load receiving element 6 for weighing items and generating analog signals representative of their weights, analog-to-digital converter means 21 connected in circuit with the load cell means 59 for receiving analog signals therefrom and converting them into digital signals, pulsing and amplifying circuit means 57, 61, 77, 79, 81, 83, 85, 87 connected in circuit between the load cell means 59 and the analog-to-digital converter means 21 to provide power to the load cell means 59 and to transmit the analog signals in pulse form to the analog-to-digital converter means 21 in an on and off fashion to conserve the energy of the battery 11, 13, digital display means 101, 103 connected in circuit with the analog-to-digital converter means 21 through a microprocessor means 99 to provide a display of signals from the analog-to-digital converter means 21 to indicate the weight of the items on the load receiving element 6, the pulsing circuit means including a monostable multivibrator 46 which is turned on to initiate power to the loadcell means 59 and to effect the transmission of said analog signals in pulse form and turned off for the non-pulse periods between pulses, wherein a pulse and a non-pulse constitute a cycle and the pulse is about 1% of the cycle and the non-pulse is about 99% of the cycle, including ambient light switching circuit means 25, 27 responsive to the presence of sufficient ambient light to be on and alternatively responsive to the lack of sufficient light to be off, said ambient light switching circuit means 25, 27 being connected to the batteries 11, 13 so that the batteries 11, 13 provides energy when the ambient light switching circuit means 27 is on and do not provide energy to the main power-consuming components of the circuit when the ambient light switching circuit means 27 is off, including scale temperature circuit means 105 connected in circuit with the analog-to-digital converter means 21 for generating a warning signal when the ambient temperature of the cordless weighing scale 5 is outside a selected range, and means for indicating that the digital display means 101, 103 may be in error when the ambient temperature of the cordless weighing scale 5 is outside the selected temperature range.

8. A circuit for use in a weighing scale 6 for weighing items and digitally displaying their weight, comprising in combination:

an electrical circuit 8 including;

battery means 11, 13 to provide d.c. electrical energy;

ambient light switching circuit means 25, 27 responsive to the presence of sufficient ambient light to be closed and alternatively responsive to the lack of sufficient light to be open, said ambient light switching circuit means 25, 27 connected to the battery means 11, 13 to enable the battery means, 11, 13 to provide electrical energy through switching circuit means 25 when said ambient light switching circuit means 27 is closed and alternatively to prohibit the transmission of electrical energy through said switching circuit means 25 to the main power-consuming components of the circuit when said ambient light switching circuit means 27 is open;

analog-to-digital converter means 21 connected to said ambient light switching circuit means 25, 27 to receive electrical energy therefrom for converting analog signals to digital signals;

load cell means 59 adapted to be connected to a load receiving element 6, such as a weighing pan, platform, scoop, hook and the like for weighing items and generating a signal representative of their weight;

first logic circuit means 61, 77, 87 connected to the ambient light switching circuit means 25, 27 to receive electrical energy from the ambient light switching circuit means 25, 27 and connected to the load cell means 59 to receive analog signals from the load cell means 59, the analog signals being indicative of weights of items being weighed, the first logic circuit means 61, 77, 87 formed to amplify the analog signals and connected to the analog-to-digital converter means 21 to transmit the analog signals thereto;

second logic circuit means 55, 57, 89 connected to the analog-to-digital converter 21 and to the first logic circuit means 61, 77, 87 to activate the first logic means 61, 77, 87 to enable the analog signals to be passed from the load cell means 59 to the analog-to-digital converter 21 during a first period and to deactivate the first logic circuit means 61, 77, 87 to prohibit the analog signals from being passed from the load cell means 59 to the analog-to-digital converter means 21 during a second period; and digital display means 101, 103 connected to the analog-to-digital converter means 21 to provide displays of the signals.

9. A circuit according to claim 8, wherein the second logic circuit means 55, 57, 89 includes a monostable multivibrator 46 which is turned on for the first period to activate the first logic circuit means and to initiate power to the load cell means 59 and turned off for said second period.

10. A circuit according to claim 9, wherein the first period plus the second period constitutes a cycle and wherein the first period is approximately 1% of the cycle and the second period is approximately 99% of the cycle.

11. A circuit according to claim 8, wherein the first logic circuit means 61, 77, 87 includes signal holding means 79, 81 which temporarily stores the analog signals so that they are available to the analog-to-digital converter means 21 beyond the first period.

12. A circuit according to claim 8, wherein the first logic circuit means 61, 77, 87 includes hold capacitor means 79, 81 which store the analog signal from the load cell means 59 to provide the analog signals to the analog-to-digital converter means 21 even after the first period has terminated.

13. A circuit according to claim 12, wherein the first logic circuit means 61, 77, 79, 81, 87 further includes switching gate means 83, 85 connected to the hold capacitor means 79, 81 and to the second logic circuit means 55, 57, 89 to be closed during the first period and opened during the second period.

14. A circuit according to claim 8, wherein there is included a third logic circuit means 107, 108, 109, 110, 111 connected to the second logic means 55, 57, 89 and to the first logic circuit means 61, 77, 87 and wherein the digital display means 101, 103 includes a microprocessor means 99 to provide interrupt signals to the third logic means 107, 108, 109, 110, 111 whereby the third logic means 107, 108, 109, 110, 111 interrupts the operation of the second logic means 55, 57, 89 and whereby the third logic means 107, 108, 109, 110, 111 provides analog signals to the analog-to-digital converter means 21 indicative of the ambient temperature in which the scale for use in a weighing scale 5 is operating.

15. A circuit according to claim 14 wherein the third logic circuit means 107, 108, 109, 110, 111 includes a thermistor 105.

16. A circuit for use in a weighing scale 5 for weighing items and digitally displaying their weight, comprising in combination:
an electrical circuit 8 including;
battery means 11, 13 to provide d.c. electrical energy 11, 13;
ambient light switching circuit means 25, 27 responsive to the presence of sufficient ambient light to be closed and alternatively responsive to the lack of sufficient light to be open, said ambient light switching circuit means 25, 27 connected to the battery means 11, 13 to enable the battery means 11, 13 to provide electrical energy through switching circuit means 25 when said ambient light switching circuit means 27 is closed and alternatively to prohibit the transmission of electrical energy through said switching circuit means 25 to the main power-consuming components of the circuit when said ambient light switching circuit means 27 is open;
analog-to-digital converter means 21 connected to said ambient light switching circuit means 25, 27 to receive electrical energy therefrom for converting analog signals to digital signals;
load cell means 59 adapted to be connected to a load receiving element 6, such as a weighing pan, platform, scoop, hook and the like for weighing items and generating a signal representative of their weight of items in said load receiving element;
first logic circuit means 61, 77, 87 connected to the ambient light switching circuit means 25, 27 to receive electrical energy from the ambient light switching means 25, 27 and connected to the load cell means 59 to receive analog signals from the load cell means 59, the analog signals being indicative of weights of items being weighed, the first logic circuit means 61, 77, 87 formed to amplify the analog signals and connected to the analog-to-digital converter means 21 to transmit the analog signals thereto;
second logic circuit means 55, 57, 89 connected to the analog-to-digital converter means 21 and to the first logic circuit means 61, 77, 87 to initiate power to the load cell means 59 and to activate the first logic circuit means 61, 77, 87 to enable the analog signals to be passed from the load cell means 59 to the analog-to-digital converter means 21 during a first period and to deactivate the first logic circuit means 61, 77, 87 to prohibit the analog signals from being passed from the load cell means 59 to the analog-to-digital converter means 21 during a second period;
digital display means 101, 103 connected to the analog-to-digital converter means 21 to provide displays of the digital signals;
the second logic circuit means 55, 57, 89 includes a monostable multivibrator 46 which is turned on for the first period to initiate power to the load cell means 59 and to activate the first logic circuit means 61, 77, 87 and turned off for said second period;
the first period plus the second period constitutes a cycle and wherein the first period is approximately 1% of the cycle and the second period is approximately 99% of the cycle;
the first logic circuit means 61, 77, 87 includes hold capacitor means 79, 81 which store the analog signals from the load cell means to provide the analog signals to the analog-to-digital converter means 21 even after the first period has terminated;
the first logic circuit means 61, 77, 79, 81, 87 further including switching gate means 83, 85 connected to the hold capacitor means 79, 81 and to the second logic circuit means 55, 57, 89 to be closed during the first period and opened during the second period;
third logic circuit means 107, 108, 109, 110, 111 connected to the second logic means 55, 57, 89 and to the first logic circuit means 61, 77, 79, 81, 83, 85, 87 to provide analog signals to the analog-to-digital converter means 21 indicative of the ambient temperature in which the circuit for use in a weighing scale is operating; and
the third logic circuit means 107, 108. 109, 110, 111 includes a thermistor 105.

17. A circuit for use in a weighing scale 5 for weighing items and digitally displaying their weight, comprising in combination: p1 an electrical circuit 8 including;
a pair 11, 13 of 9 volt batteries to provide d.c. electrical energy;
an MR D 3054 photo detector 27 responsive to the presence of sufficient ambient light to be closed and alternatively responsive to the lack of sufficient light to be open, said photo detector 27 activates switching transistor 25, which is connected to the batteries 11, 13 to enable the batteries 11, 13 to provide electrical energy through said switching transistor 25 when said photo detector 27 is closed and alternatively to prohibit the transmission of electrical energy through said switching transistor 25 when said photo detector 27 is open;
MAX134CPL analog-to-digital converter 21 connected to said switching transistor 25 to receive electrical energy therefrom for converting analog signals to digital signals;
a 750 ohms impedance strain gauge load cell 59 adapted to be connected to a load receiving element 6, such as a weighing pan, platform, scoop, hook and the like for weighing items and generating analog signals representative of the weight of items in said load receiving element;
first logic circuit means 61, 77, 87, including an OP7-7EP amplifier 61, a TLC27L2CP follower 77, and a TLC27L2CP follower 87, connected to the switching transistor 25 to receive electrical energy from the batteries 11, 13 and connected to the 750 ohm impedance strain gauge load cell 59 to receive analog signals from the 750 ohm impedance strain gauge load cell 59, the analog signals being indicative of weights of items being weighed, the first logic circuit means 61, 77, 87 formed to amplify the analog signals and connected to the analog-to-digital converter 21 to transmit the analog signals thereto;

second logic circuit means 55, 57, 89, including a CD4077BE amplifier 55, a VN0300L transistor 57, and a CD4077BE gate 89, connected to the analog-to-digital converter 21 and to the first logic circuit means 61, 77, 87 to initiate power to the load cell means 59 and to activate the first logic circuit means 61, 77, 87 to enable the analog signals to be passed from the 750 ohm impedance strain gauge load cell 59 to the analog-to-digital converter 21 during a first period and to deactivate the first logic circuit means 61, 77, 87 to prohibit the analog signals from being passed from the 750 ohm impedance strain gauge load cell 59 to the analog-to-digital converter 21 during a second period;

digital display means 101, 103 connected to the analog-to-digital converter 21 to provide displays of the digital signals;

the second logic circuit means 55, 57, 89 includes a CD 4013BE dual flop-flop monostable multivibrator 46 which is turned on for the first period to activate the first logic circuit means and turned off for said second period;

the first period plus the second period constitutes a cycle and wherein the first period is approximately 1% of the cycle and the second period is approximately 99% of the cycle;

the first logic circuit means 61, 77, 87 includes two 0.047 uF hold capacitors 79, 81 which store analog signals from the 750 ohm impedance strain gauge load cell 59 to provide the analog signals to the analog-to-digital converter 21 even after the first period has terminated;

the first logic circuit means 61, 77, 79, 81, 87 further includes two MC1401BCP switching gates 83, 85 connected to the hold capacitors 79, 81 and to the second logic circuit means 46, 55, 57, 89 to be closed during the first period and opened during the second period;

third logic circuit means 107, 108, 109, 110, 111 including two MC14016BCP gates 107, 108, one CD4077BE gate 111 and two 18.7K ohm resistors 109, 110, connected to the second logic means 46, 55, 57, 89 and to the first logic circuit means 61, 77, 79, 81, 83, 85, 87 to provide analog signals to the analog-to-digital converter 21 indicative of the ambient temperature in which the circuit 8 for use in a weighing scale 5 is operating; and the third logic circuit means includes an NTC 1C1001-2 thermistor 105.

* * * * *